United States Patent
Safavi-Naeini et al.

(10) Patent No.: US 10,782,404 B2
(45) Date of Patent: Sep. 22, 2020

(54) MM-WAVE SFCW RADAR AND SAF BASED IMAGING INSPECTION SYSTEM

(71) Applicant: OZ Optics Ltd., Ottawa (CA)

(72) Inventors: Safieddin Safavi-Naeini, Waterloo (CA); Shahed Shahir, Waterloo (CA)

(73) Assignee: OZ Optics Limited, Ottawa (CA)

( * ) Notice: Subject to any disclaimer, the term of this patent is extended or adjusted under 35 U.S.C. 154(b) by 185 days.

(21) Appl. No.: 15/864,103

(22) Filed: Jan. 8, 2018

(65) Prior Publication Data

US 2018/0196134 A1     Jul. 12, 2018

(30) Foreign Application Priority Data

Jan. 9, 2017 (CA) ...................................... 2953984

(51) Int. Cl.
| | |
|---|---|
| *G01S 13/88* | (2006.01) |
| *G01S 13/90* | (2006.01) |
| *G01S 13/38* | (2006.01) |
| *G01S 13/02* | (2006.01) |
| *G01V 8/00* | (2006.01) |

(52) U.S. Cl.
CPC ............ *G01S 13/887* (2013.01); *G01S 13/38* (2013.01); *G01S 13/90* (2013.01); *G01S 2013/0245* (2013.01); *G01S 2013/0263* (2013.01); *G01V 8/005* (2013.01)

(58) Field of Classification Search
CPC ........ G01S 13/887; G01S 13/90; G01S 13/38; G01S 2013/0245; G01S 2013/0263; G01V 8/005
USPC ....................................................... 342/179
See application file for complete search history.

(56) References Cited

U.S. PATENT DOCUMENTS 5,341,141 A * 8/1994 Frazier ...................... G01S 7/20
 342/59
9,638,826 B2 * 5/2017 Sokolowsky ............ G01V 3/38
(Continued)

FOREIGN PATENT DOCUMENTS

RU      2564693 C1    10/2015

OTHER PUBLICATIONS

Joongsuk Park et al., "Development of a New Millimeter-Wave Integrated-Circuit Sensor for Surface and Subsurface Sensing", IEEE Sensors Journal, vol. 6, No. 3, Jun. 1, 2006 (Jun. 1, 2006), pp. 650-655, XP055473438, USA.
(Continued)

*Primary Examiner* — Frank J McGue
(74) *Attorney, Agent, or Firm* — Hoffmann & Baron, LLP

(57) ABSTRACT

The present invention presents a flexible, stepped frequency, radar based, imaging inspection system. The imaging inspection system can be used in airports, seaport sites, borders, postal processing centres, and sensitive sites. It comprises a millimetre-wave Stepped Frequency Continuous Wave (SFCW) radar module (2) connected to a transmitting channel and a receiving channel. The transmitting channel may comprise a frequency upconvertor (8) and the receiving channel may comprise a frequency downconvertor (10). A digital signal processing unit (14) reconstructs a conductivity profile and a permittivity profile of an object under test (OUT) from measurement data collected via a phase-array antenna or a translational stage (18) based on synthetic aperture focusing (SAF).

2 Claims, 7 Drawing Sheets

(56) References Cited

U.S. PATENT DOCUMENTS

2011/0234443 A1  9/2011  Nakasha
2018/0003799 A1* 1/2018  Yang ....................... G01S 7/023

OTHER PUBLICATIONS

David M. Sheen et al., "Three-Dimensional Millimeter-Wave Imaging for Concealed Weapon Detection", IEEE Transactions on Microwave Theory and Techniques, vol. 49, No. 9, Sep. 30, 2001 (Sep. 30, 2001), pp. 1581-1592, XP055396138, USA.

Janez Trontelj et al., "Electronic Terahertz Imaging for Security Applications", SPIE, vol. 9747, Feb. 25, 2016 (Feb. 25, 2016), pp. 97413-974713, XP060068714.

Hue Phat Tran et al., "A Fast Scanning W-Band System for Advanced Millimetre-Wave Short Range Imaging Applications", 3rd European Radar Conference, Sep. 1, 2006 (Sep. 1, 2006), pp. 146-149, XP031006005, Germany.

Alexander Dallinger et al., "Short Distance Related Security Millimeter-Wave Imaging Systems", German Microwave Conference, Apr. 5, 2005 (Apr. 5, 2005), pp. 244-246, XP002394809, Germany.

* cited by examiner (a)

(b)

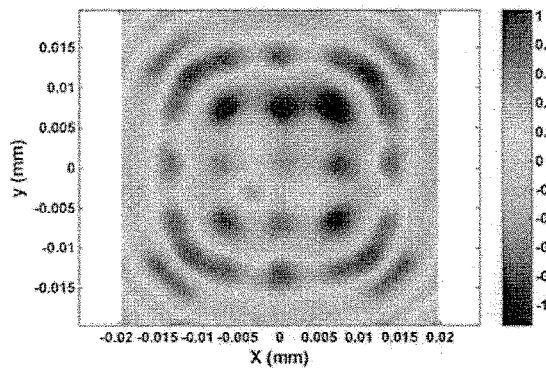
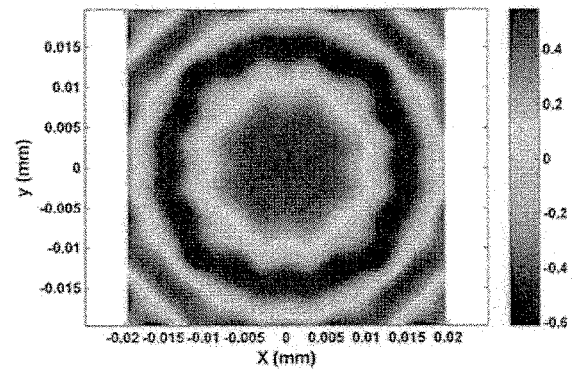
Figure 7               Figure 8
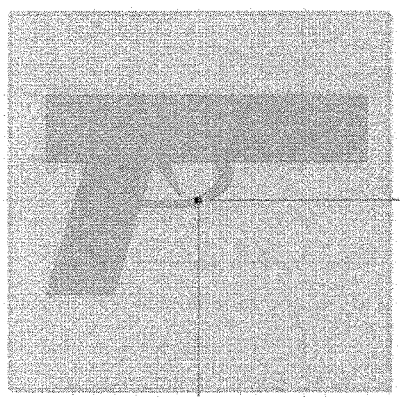
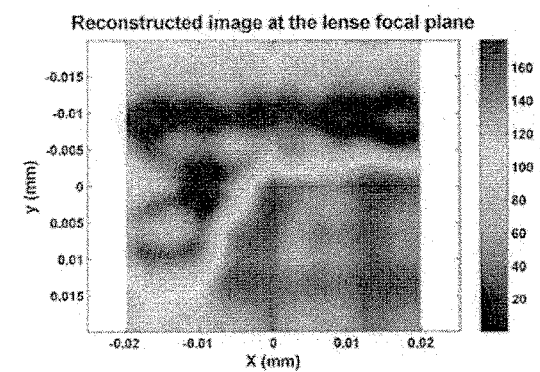
Figure 9               Figure 10

MM-WAVE SFCW RADAR AND SAF BASED IMAGING INSPECTION SYSTEM

CROSS REFERENCE TO RELATED APPLICATION

This application claims priority to Jan. 8, 2018 Canadian Patent Application No. 2,953,984, filed on Jan. 9, 2017, the contents of which are incorporated herein by reference in its entirety.

TECHNICAL FIELD

The present invention pertains to a flexible, stepped frequency, radar based, imaging inspection, synthetic aperture focusing, and packaging inspection system.

BACKGROUND OF THE INVENTION

The exponential growth of e-commerce in conjunction with threats pertaining to the drug trade and terrorism are creating a significant need for inspection sites (postal processing centers, airports, seaports, border, and etc.) to upgrade and expand their capabilities. It is important to prevent hazardous and explosive materials, and illegal drugs transportation across international borders.

The Millimeter-wave and Terahertz radiations are more suitable for the packaging inspection than other parts of spectrum, namely infrared, visible light, ultraviolet, X-ray or radio-wave radiations since the visible and infrared radiation cannot penetrate inside the package. X-ray and ultraviolet radiation penetrates inside the package and can be used for imaging the high-contrast materials only in the package under test (PUT) but is not suitable for the low-contrast materials or material characterization. The millimeter-wave and Terahertz radiations are safe in comparison with X-ray and ultraviolet, penetrate inside the dielectric opaque material, and can provide higher resolution than radio-wave radiations.

Due to the high demand, many imaging sensors are developed at the millimeter-wave and Terahertz frequency range [1-4]. The imaging sensors based on magnetoplasma excitations and uncooled microbolometer pixel array are reported by TeraSense [2] and Institut National d'Optique (INO) [3], respectively. The imaging sensors are incoherent. Implemented for drugs identification inside a postal enveloped, the Terahertz imaging system based on the signal absorption rates is reported in [4]. The aforementioned imaging sensors and the imaging systems are able to measure the signal absorption, but unable to measure the signal phase. Without recovering the phase information, the depth information and the permittivity profile cannot be retrieved.

Phase array antenna is a common option for recovering both the amplitude and phase information, but the phase array antenna implementation is very complex and expensive. Terahertz-Technology built T-sense imaging system by using the unwrapping approach to retrieve the phase. The phase information and amplitude are used to image very thin materials with very low resolution [5]. Stepped frequency continuous wave (SFCW) radar is an efficient tool for surface and near-surface remote sensing, and is well documented [6-7].

The synthetic aperture techniques such as, synthetic aperture radar (SAR), synthetic aperture tomography (SAT), and synthetic aperture focusing (SAF), transfer the system complexity from the hardware side into the algorithm/software side. The SAR is widely used for the superficial remote sensing in microwave frequency [8-10]. The SAT is employed by using ultrasonic-waves for obtaining depth information of biological tissue for medical imaging purpose [9] by illuminating the tissue under test from different directions. The SAF has recently been used for collecting the depth information and suppressing the noise [11-16] by illuminating the object under test from a single direction (one side).

SUMMARY OF THE INVENTION

Synthetic aperture techniques provide a way around the complexity and cost of the phase array antenna temporarily and enable use of existing antenna measurement techniques for making high resolution images at the Millimeter-wave and Terahertz frequency range on a system level. The MM-Wave sectional images of the object at different depths will also be estimated at the desired depth. The Synthetic Aperture Focusing (SAF) technique may be used for not only reconstructing MM-Wave sectional images at different depths similar to other non-destructive tests implemented by other researchers [13-18], but also characterizing the materials inside the PUT from the electromagnetic fields measured outside PUT [19].

In the present invention, there is provided a flexible imaging inspection system by utilizing the Step Frequency Continuous Wave (SFCW) radar concepts. The system is flexible to work at different frequencies for different imaging and sensing.

One aspect of the present invention sets forth an imaging inspection system comprising a MM-Wave SFCW Radar module; transmitting means and receiving means connected to the radar module; a control unit for controlling the system; a digital signal processing (DSP) unit; an analog to digital convertor (ADC); and a translational stage.

BRIEF DESCRIPTION OF THE DRAWINGS

FIG. 7 shows the electric field back propagated to the artificial lens focal plane;
FIG. 8 shows the artificial lens impulse response;
FIG. 9 shows the gun image from the top view;
FIG. 10 shows the reconstructed gun image.

DETAILED DESCRIPTION OF THE INVENTION

Figure 1:
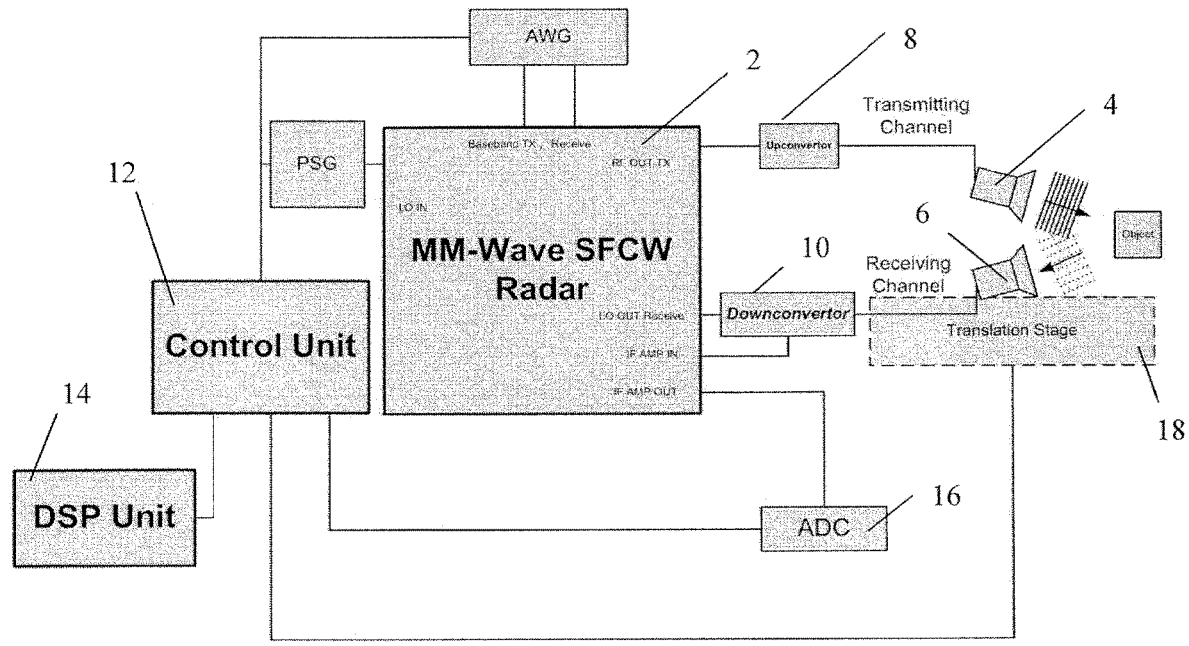
FIG. 1 shows a system block diagram.
Figure 2:
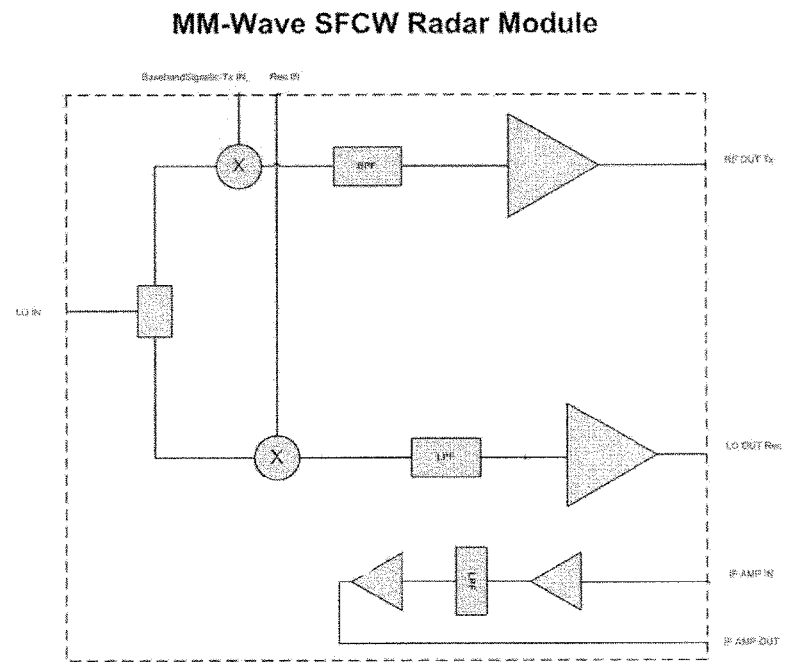
FIG. 2 shows a MM-Wave SFCW Radar module block diagram.

A low-cost flexible inspection imaging system is presented. The system block diagram is shown in FIG. 1. The flexible imaging inspection system consists of a MM-Wave SFCW Radar module 2, transmitting antenna 4, receiving antenna 6, frequency upconvertor 8, frequency downconvertor 10, control unit 12, digital signal processing (DSP) unit 14, analog to digital convertor 16, and a translation stage 18. The MM-Wave SFCW Radar module 2 generates the RF output signal, LO signal for down converting the receiving RF signal, and amplifies the IF signal for improving the Signal to Noise Ratio (SNR). The MM-Wave SFCW Radar module 2 block diagram is shown in FIG. 2. The transmitting channel includes the upconvertor 8 and transmitting antenna 4, and the receiving channel includes receiving antenna 6 (probe) and down convertor 10 as shown in FIG. 1. The control unit 12 synchronizes the interaction between all modules, reads the signal digitized by the Analog to Digital Converter (ADC) 16, and applies a low-pass filter for improving the signal SNR. The DSP unit 14 reconstructs the conductivity profile and the permittivity profile of the object under-test (OUT) based on the SAF.

Figure 3:
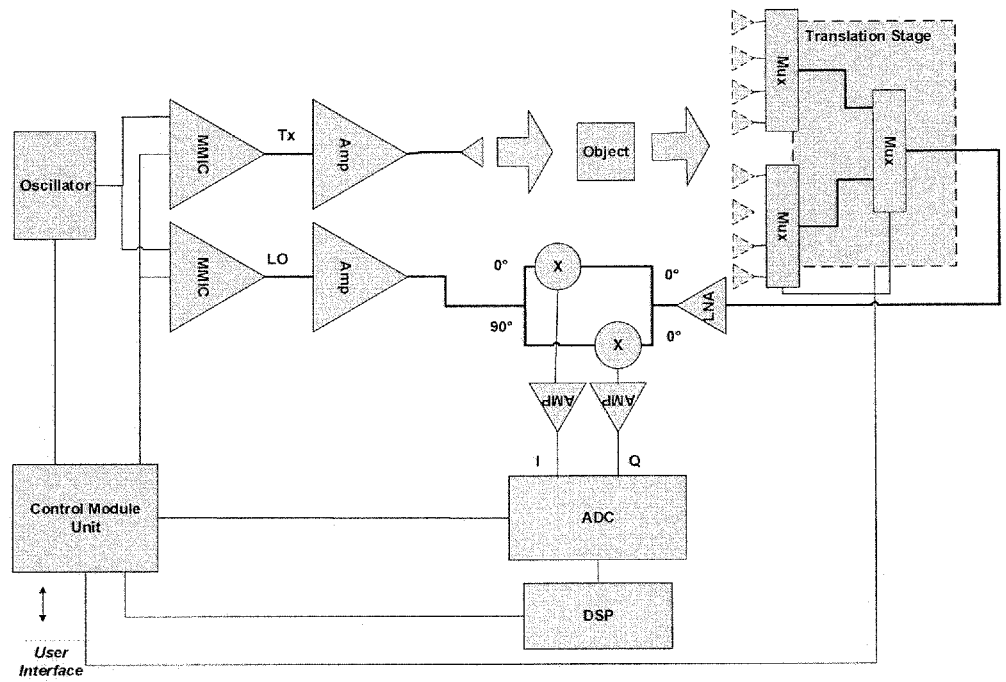
FIG. 3 shows MMIC-based security inspection system schematic on (a) reflection and (b) transmission.
Figure 3:
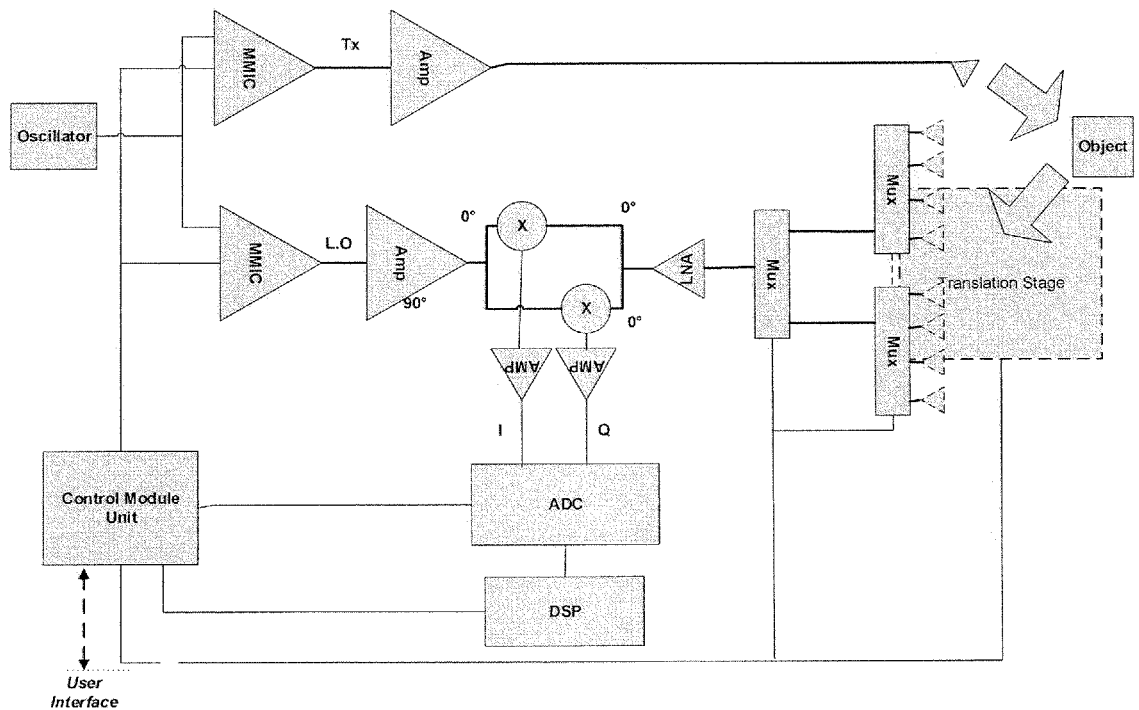

The Millimeter-wave Integrated Circuit (MMIC) technology lowers the manufacturing cost substantially at the mass production stage. Such a MMIC-based imaging system consists of a local oscillator, two MMICs, two RF amplifiers, two IF amplifiers, a low-noise amplifier, two down-converter mixers (or an IQ down-convertor mixer), multiplexers, 2D translation stage, two analog to digital convertor, a control module unit (CMU), a digital signal processing unit, a user interface, and a transmitting antenna and the receiving array antennas as shown in FIG. 3. The proposed system schematics in reflection and transmission modes are shown in FIGS. 3.$a$ and $b$, respectively.

The local oscillator makes the outputs of both MMICs in-phase with the oscillator signal. Each MMIC includes phase-locked loop (PLL), and the 6×-frequency multiplier. The PLL generates the signal in phase, and the frequency multiplier increases the PLL-output signal frequency to the desired operation frequency. Due to the harmonic frequency multiplier property, the MMIC output power will be very low. For that reason, the RF amplifier considered after the MMIC increases the signal power level correspondingly for feeding the transmitting antenna or the down-convertor mixer LO port. The RF transmitting and LO amplifiers feed the transmitting antenna and the down-convertor-mixer LO port, respectively. The CMU does synchronizing the signal measurement, data retrieval, and the image construction.

The synthetic aperture focusing (SAF) technique may be implemented and tested for seeing inside an opaque box (dielectric) and retrieving the internal sectional image of a PUT using the electric fields measured outside the PUT over the observation domain. For obtaining the depth information and retrieving the focal plane image at different depths, the signal phase retrieval is essential. The phase information is retrievable when both real and imaginary parts of a signal are available. As a result, a signal phase can be obtained in both hardware (by using 90 degree phase shifter in real-time as shown in FIG. 3) and software (by applying discrete Hilbert transform).

The sectional images of the object at different depths will also be estimated at the desired depth through SAFT.

Synthetic Aperture Focusing System

Figure 4:
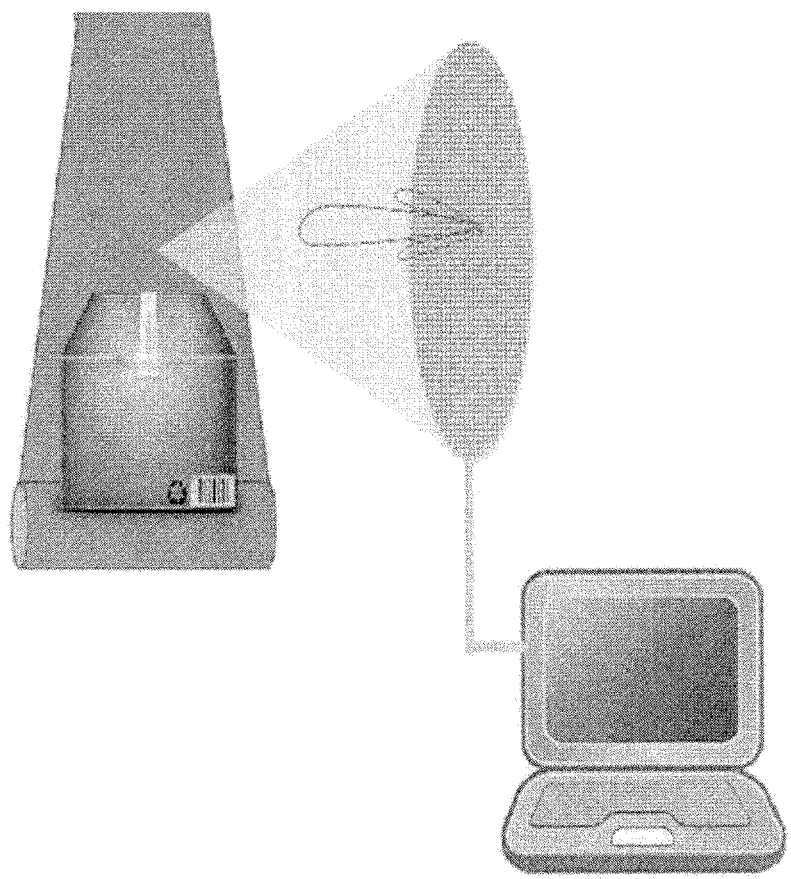
FIG. 4 shows a SAF based security imaging system.

The MM-Wave/THz radiations can penetrate deep inside an opaque material and be used to see inside an object, parcel, or package. The signals measured outside an object under test (OUT) carry information about the object and the material inside the object. After measuring the signals outside an OUT, reconstructing the internal cross-section of OUT is the next important task for inspecting a package. Synthetic Aperture Focusing is a technique through which the internal cross section of an object can be reconstructed. The SAF based security imaging system is illustrated in FIG. 4.

Synthetic Aperture Focusing Technique

The concept of SAF was used first for reconstructing images for ultrasound machines in early 1970 [17]. FIG. 4 depicts the SAF approach concept, and the SAF algorithm can be formulated [18] as follows:

$$s(x,y)=\iint F(k_u,k_v)e^{jk_zz}e^{j(k_ux+k_vy)}dk_udk_v,$$

$$s(x,y)=FT_{2D}^{-1}[F(k_u,k_v)e^{jk_zz}],$$

$$F(k_u,k_v)=FT_{2D}[s(x,y)]e^{-jk_zz},$$

which $$f(x,y)=FT_{2D}^{-1}[FT_{2D}[s(x,y)]e^{-jk_zz}]$$

Where $s(x,y)$ and $f(x,y)$ are the electric fields at the measurement plane (z=0) and the electric fields at the synthetic lens focal length (z=−f) as shown in FIG. 4, respectively. The $FT_{2D}$ and $FT_{2D}^{-1}$ represent 2D Fourier and inverse Fourier transform operations, respectively.

Figure 5:
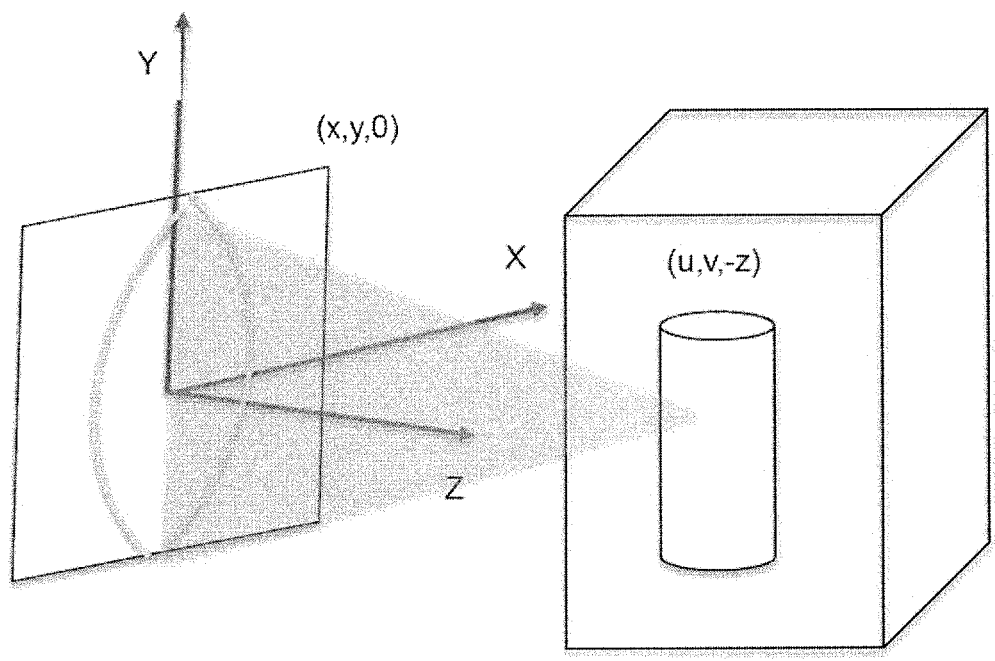
FIG. 5 shows the SAF concept.
Figure 6:
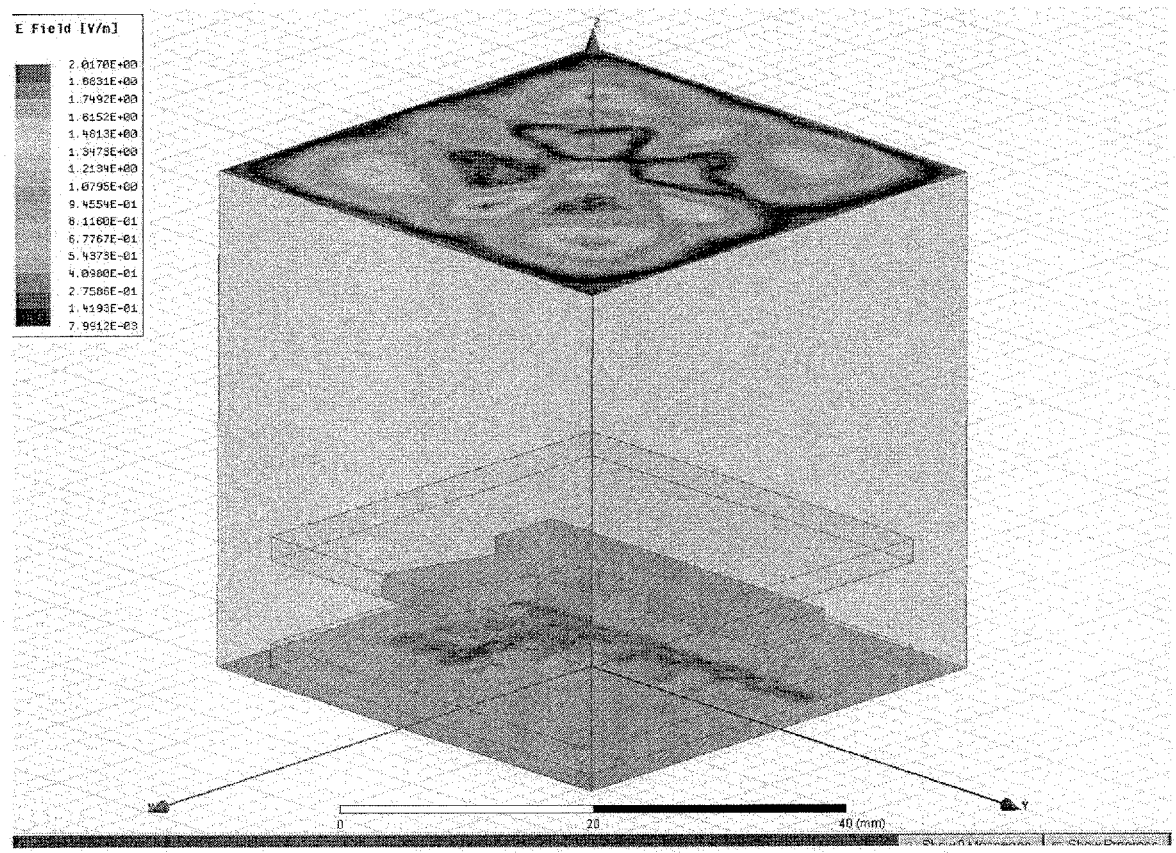
FIG. 6 shows the security imaging system.

For developing the SAF image reconstruction algorithm, an aluminum gun is placed in a Teflon box with the half wavelength side-wall thickness. The box is illuminated with a plane wave at 80 GHz, and the total fields are measured at the observation plane, which is 8 wavelengths away from the box lateral surface. The simulation is shown in FIG. 5. After applying the Fourier transform operation over the electromagnetic fields measured at the observation plane, the electric fields may be back propagated to the focal plane of an artificial lens. The electric fields back-propagated to the lens focal plane as depicted in FIG. 7, and the lens impulse response at the focal plane (f=10λ) is shown in FIG. 8. The gun image may be reconstructed by compensating the lens effect on the back-propagated electric field plane at 80 GHz. The reconstructed gun image is illustrated in FIG. 10. The accuracy of the reconstructed image can be validated by comparing FIGS. 9 and 10.

The reconstruction resolution can be improved by 1) illuminating the box with a wide-band signal, 2) setting the artificial lens focal point at the far field, and 3) using the full-field back-propagation formulation rather than the Fresnel approximation. Furthermore, retrieving the boundary of the object inside the box allows to estimate the permittivity profiles at different cross sections [19].

Experimental Results

The following example discusses a flexible imaging inspection system implementation at the W-band frequency range. Those skilled in the art will appreciate this is but one exemplary implementation of the system and will appreciate variations that may be possible.

Figure 11:
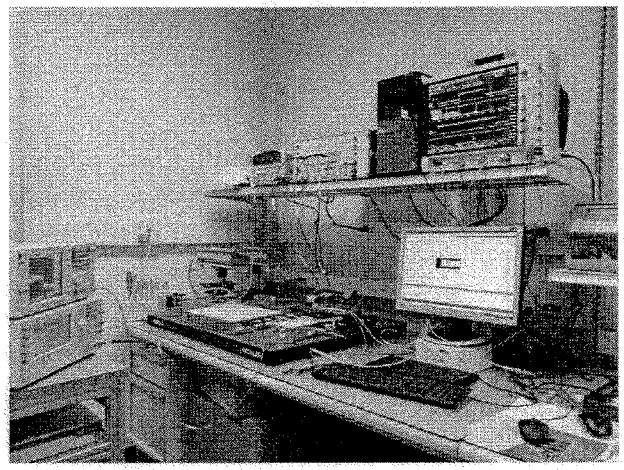
FIG. 11 shows a system picture.
Figure 12:
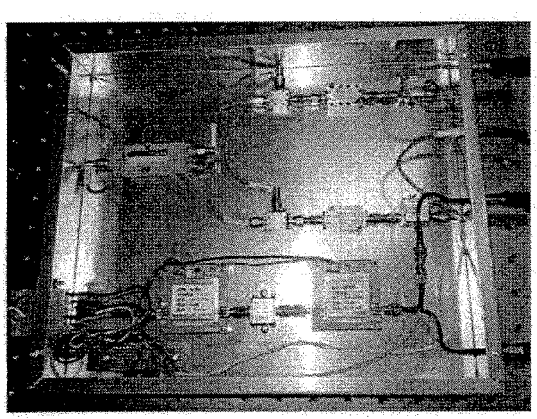
FIG. 12 shows the implemented MM-Wave SFCW radar picture.
Figure 13:
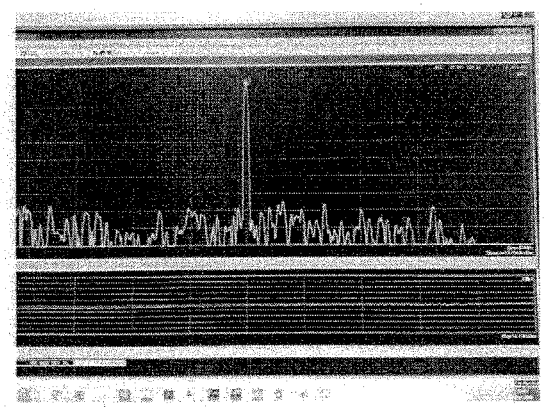
FIG. 13 shows the IF output signal in time domain and spectrum domain.

The system picture is shown in FIG. 11, and the implemented MM-Wave SFCW radar picture is illustrated in FIG. 12. The system covers a frequency band from 78.6 GHz up to 80.6 GHz with the 10 MHz step frequency. In this experiment, the W-band OML modules are used to upconvert the MM-Wave SFCW Radar output frequency to the desired frequency on the transmitting channel, and downconvert the received signal on the receiving channel A Keysight vector signal generator is used to feed the upconvertor mixer LOs on the transmitting and the receiving channel of the MM-Wave SFCW Radar module. Two distinct baseband signal frequencies on the transmitting and receiving channels are preferable due to the differences between the up-conversion factor and the down-conversion factor on the transmission and the receiving modes of the OML modules. The Keysight arbitrary wave generator (AWG) is used to generate two distinct phased-matched frequencies for the baseband signals on the transmitting and receiving channels and improve the system performance by deviating from the IF-zero frequency at the IF output. The Keysight 12 bits digitizer converts the analog output of the MM-Wave SFCW Radar module to the digital signal. An Altera™ FPGA is programmed to work as the control unit for synchronizing all modules. The digital signal processing code is developed in Matlab™ in a Dell™ OpticPlex™ PC. The PC and the FPGA communicate through the RS32 port. FIG. 13 shows the IF output signal in the time domain and spectrum domain. The output signals (40 MHz), which contain the electric fields scattered from the PUT, have been retrieved throughout the implemented system frequency operational range. By having the output at the fixed IF frequency, the amplitude and the phase of the scattered fields is retrieved, and the PUT image is reconstructed.

In the present invention, a MM-Wave SFCW Radar based flexible imaging system is presented and the system RF side is tested successfully. The proposed system can be used, for example, for security inspection at postal processing centers, airports, seaports, and borders to prevent the transportation of the illegal drugs, material, and goods across the international borders.

It will be appreciated by one skilled in the art that variants can exist in the above-described arrangements and applications. The specific examples provided herein relate to a flexible imaging inspection system implementation at the W-band frequency range; however one skilled in the art will appreciate variations that could exist in the materials, methods of application and arrangements of the invention.

The scope of the claims should not be limited by the preferred embodiments set forth in the examples, but should be given the broadest interpretation consistent with the description as a whole.

REFERENCES

[1] Janez Trontelj and Aleksander Sesek, Electronic terahertz imaging for security applications, SPIE, 2016.
[2] Kozlov, V. E., et al. "Microwave magnetoplasma resonances of two-dimensional electrons in MgZnO/ZnO heterojunctions." Physical Review B 91.8, 085304, 2015.
[3] Bolduc, Martin, et al. "Noise-equivalent power characterization of an uncooled microbolometer-based THz imaging camera." SPIE Defense, Security, and Sensing. International Society for Optics and Photonics, 2011.
[4] Kawase, Kodo, Yuichi Ogawa, Yuuki Watanabe, and Hiroyuki Inoue, "Non-destructive terahertz imaging of illicit drugs using spectral fingerprints." Optics express 11.20, pp. 2549-2554, 2003.
[5] Nüßier, Dirk, Sven Heinen, Thorsten Sprenger, Daniel Hübsch, and Tobais Würschmidt. "T-SENSE a millimeter wave scanner for letters." In SPIE Security+ Defence, pp. 89000M-89000M. International Society for Optics and Photonics, 2013.
[6] Lambot, Sébastien, et al. "Modeling of ground-penetrating radar for accurate characterization of subsurface electric properties." IEEE Transactions on Geoscience and Remote Sensing 42.11, pp. 2555-2568, 2004.
[7] Van Genderen, Piet. "Multi-waveform SFCW radar." Microwave Conference, 2003. 33rd European. Vol. 2. IEEE, 2003.
[8] Rosen, P. A.; Hensley, S.; Joughin, I. R.; Madsen, S. N.; Ernesto & Goldstein, R. M. Synthetic Aperture Radar Interferometry Proceedings of The IEEE, Vol. 88, pp. 333-383, 2000.
[9] Rongqing, X.; Zhidao, C. & Fulin, S. Synthetic aperture radar imaging for objects embedded in a half-space lossy medium at close range SPIE Proceeding, Vol. 1875, pp. 146-156, 1993.
[10] Adams, M. & Anderson, A. Synthetic aperture tomographic (SAT) imaging for microwave diagnostics Microwaves, Optics, and Antennas, IEE proceedings, Vol. 129, pp. 83-88, 1982.
[11] Aparajita Bandyopadhyay, Andrei Stepanov, Brian Schulkin, Michael D. Federici, Amartya Sengupta, Dale Gary, and John F. Federici, and Robert Barat, Zio Michalopoulou, "Terahertz interferometric and synthetic aperture Imaging," Journal of Optical Society of America, Vol 23, pp. 1168-1179, 2006.
[12] Samuel C. Henry, 3-D Terahertz Synthetic-Aperture Imaging and Spectroscopy," PhD Dissertations and Theses, 2013.
[13] Krozer, Viktor, et al. "Terahertz imaging systems with aperture synthesis techniques." Microwave Theory and Techniques, IEEE Transactions on, Vol 58.7, pp. 2027-2039, 2010.
[14] Walsh, Kenneth P., et al. "Terahertz near-field interferometric and synthetic aperture imaging." Defense and Security. International Society for Optics and Photonics, 2004.
[15] Zhang, Zhuopeng, and Takashi Buma. "Improved THz imaging with a virtual-source based synthetic aperture focusing technique and coherence weighting." Conference on Lasers and Electro-Optics. Optical Society of America, 2009.
[16] Zhang, Zhuopeng. Terahertz pulsed imaging with adaptive reconstruction techniques. UNIVERSITY OF DELAWARE, 2012.
[17] Boyer, A. L, "Reconstruction of Ultrasonic Image by Backward Propagation," Acoustic Holography, 1970.
[18] Sheen, D. M.; McMakin, D. L. & Hall, T. E. Three-Dimensional Millimeter-Wave Imaging for Concealed Weapon Detection IEEE Transactions on Microwave Theory and Techniques, 2001.
[19] S. Shahir, M. Mohajer, A. Rohani, and S. Safavi-Naeini, "Permittivity Profile Estimation based on Non-radiating Equivalent Current Source," Progress In Electromagnetic Research B, Vol. 50, pp. 157-175, 2013.

What is claimed is:

1. An imaging inspection system for inspecting a Package Under Test (PUT) comprising:
a MM-Wave SFCW Radar module, wherein the radar module includes at least one transmitting antenna and at least one receiving antenna;
a first in-phase quadrature I/Q mixer for upconverting a signal to millimeter-wave frequency range for the at least one transmitting antenna and a second in-phase quadrature I/Q mixer for downconverting a signal from the at least one receiving antenna from millimeter-wave frequency to IF frequency and rejecting image signals;
an analog to digital convertor (ADC) for converting a signal from the MM-Wave SFCW radar module;
a digital signal processing (DSP) unit for processing the converted signal from the ADC;
a translational stage configured to move the at least one receiving antenna; and
a control unit for controlling the DSP, ADC, MM-Wave SFCW radar module and translational stage, wherein the control unit is configured to perform an image reconstruction task and synchronize interaction between the radar module, DSP, ADC and translational stage, and read a signal digitized by the ADC;

wherein the DSP unit is configured to back propagate measured electric fields to an image plane of an artificial lens and reconstruct sectional images at different depths inside the PUT;

wherein the DSP unit is configured to reconstruct a conductivity profile and a permittivity profile of the PUT from measurement data collected via the at least one receiving antenna or the translational stage based on synthetic aperture focusing (SAF); and wherein the DSP unit is configured to estimate the conductivity profile and the permittivity profile inside the PUT corresponding to internal electric fields inside the PUT.

2. The imaging inspection system of claim 1, wherein the DSP unit is configured to reconstruct the image plane at different depths inside the PUT by changing either a focal length or frequency of the artificial lens.

* * * * *